(12) United States Patent
Staebler et al.

(10) Patent No.: US 8,376,392 B2
(45) Date of Patent: Feb. 19, 2013

(54) AIRBAG ARRANGEMENT

(75) Inventors: Denis Staebler, Peine (DE); Rainer Holtorp, Sontra (DE); Andreas Bachmann, Nieste (DE); Tobias Puetz, Meine (DE); Frank Ketelsen, Eicklingen (DE); Stefan Schmedes, Heilshorn (DE)

(73) Assignees: Faurecia Innenraum Systeme GmbH, Hagenbach (DE); A. Raymond et Cie, Grenoble (FR)

( * ) Notice: Subject to any disclaimer, the term of this patent is extended or adjusted under 35 U.S.C. 154(b) by 36 days.

(21) Appl. No.: 12/737,726

(22) PCT Filed: Aug. 18, 2009

(86) PCT No.: PCT/EP2009/006072
§ 371 (c)(1),
(2), (4) Date: Apr. 4, 2011

(87) PCT Pub. No.: WO2010/020420
PCT Pub. Date: Feb. 25, 2010

(65) Prior Publication Data
US 2011/0187085 A1    Aug. 4, 2011

(30) Foreign Application Priority Data
Aug. 19, 2008   (DE) .......................... 10 2008 039 180

(51) Int. Cl.
*B60R 21/20*    (2011.01)
*B60R 21/205*   (2011.01)
(52) U.S. Cl. ..................................... 280/728.2; 280/732

(58) Field of Classification Search ............... 280/728.2, 280/732; 403/408.1; 411/81, 166, 167, 427
See application file for complete search history.

(56) References Cited

U.S. PATENT DOCUMENTS
2,494,882 A   1/1950  Kost
2,684,704 A   7/1954  Crowther
(Continued)

FOREIGN PATENT DOCUMENTS
DE   195 05 307 A1   8/1995
DE   198 33 552 A1   2/2000
(Continued)

OTHER PUBLICATIONS

"Screw" Definition, Merriam-Webster's Online Dictionary, available at, http://www.merriam-webster.com/dictionary/screw (last visited Aug. 3, 2012).*

*Primary Examiner* — Joseph Rocca
(74) *Attorney, Agent, or Firm* — Marshall & Melhorn, LLC (57) ABSTRACT

The invention relates to an airbag arrangement, comprising a carrier of an airbag covering, an airbag module which is arranged on a rear side of the carrier and which is fastened on the carrier at at least one location, by way of a screw connection, as well as a reinforcement part which is formed from a sheet-metal piece in a single-piece manner, is involved in the screw connection and comprises at least one rim-hole provided with an inner thread, for screwing a screw of the screw connection and with which a holding force provided by the screw may be introduced into the carrier, wherein the reinforcement part is supported on a front side of the carrier and wherein the airbag module is screwed to the reinforcement part through a hole in the carrier which is aligned with the at least one rim-hole.

15 Claims, 5 Drawing Sheets

U.S. PATENT DOCUMENTS

| | | | |
|---|---|---|---|
| 3,921,686 A * | 11/1975 | Markey | 411/167 |
| 4,448,565 A | 5/1984 | Peterson | |
| 5,513,876 A | 5/1996 | Matsumoto | |
| 5,904,367 A | 5/1999 | Warnez et al. | |
| 6,070,901 A | 6/2000 | Hazell et al. | |
| 6,908,274 B1 | 6/2005 | Vassiliou | |
| 6,908,521 B2 | 6/2005 | Ponthieu | |
| 7,407,180 B2 | 8/2008 | Yokoyama et al. | |
| 7,425,122 B2 * | 9/2008 | Winget et al. | 425/116 |
| 7,841,617 B2 | 11/2010 | Brandstatter | |
| 8,220,825 B2 * | 7/2012 | Bonarens et al. | 280/728.2 |
| 2003/0015859 A1 * | 1/2003 | Nakazawa | 280/728.2 |
| 2004/0026009 A1 * | 2/2004 | Ponthieu | 156/73.1 |
| 2005/0029778 A1 * | 2/2005 | Weber et al. | 280/728.2 |
| 2006/0210662 A1 * | 9/2006 | Winget et al. | 425/129.1 |
| 2006/0220355 A1 * | 10/2006 | Yokoyama et al. | 280/728.3 |

FOREIGN PATENT DOCUMENTS

| | | |
|---|---|---|
| DE | 199 48 125 A1 | 4/2000 |
| DE | 103 04 197 A1 | 8/2004 |
| EP | 1 354 773 B1 | 6/2005 |
| FR | 2 523 663 A1 | 9/1983 |
| WO | WO 2008025709 A1 * | 3/2008 |

* cited by examiner

AIRBAG ARRANGEMENT

BACKGROUND OF THE INVENTION

The invention relates to an airbag arrangement with a reinforcement part for a screw connection for fastening an airbag module to a two-dimensional carrier.

Reinforcement parts, with which a holding force provided by a screw may be introduced into a carrier, and which are formed as one piece of a sheet-material part, are known per se. A particularly simple realisation of such reinforcement parts are formed by underlay disks. Such reinforcement parts may also display more complex shapes, depending on what type of objects are to be fastened on a carrier with the help of such reinforcement parts.

The document DE 103 04 197 A1 describes an airbag arrangement, with which an airbag module is fastened on a carrier of an inner trim part for motor vehicles, with the help of a comparable reinforcement part. The reinforcement parts there are indicated as metal bridges and are designed as sheet-metal strips which rest on an upper side of a plastic carrier of the inner trim part and which in each case hold two threaded bolts, onto which in turn in each case a nut is screwed at a rear side of the inner trim part, in order to hold the airbag module. With the air bag arrangement which is suggested there, thus relatively many components are necessary, in order to fasten the airbag module on the inner trim part, specifically additionally to the reinforcement parts, the mentioned threaded bolts and the nuts which are screwed thereon. The fastening of the airbag module onto the plastic carrier of the inner trim part, as a result entails a disadvantageously large amount of effort with the state of the art from the document DE 103 04 197 A1.

BRIEF SUMMARY OF THE INVENTION

It is the object of the present invention, to suggest an airbag arrangement with a comparable reinforcement part for a screw connection for fastening an airbag module on a two-dimensional carrier of an airbag covering, wherein the reinforcement part on the one hand may be manufactured itself with little effort and on the other hand a realisation of the screw connection is to be made possible with comparatively little effort and in particular with an as small as possible number of parts.

According to the invention, this object is achieved by an airbag arrangement with the features of the main claim. Advantageous designs and further developments of the invention are to be deduced from the features of the dependent claims.

An airbag arrangement according to the invention accordingly comprises a carrier of an airbag covering, and an airbag module which is arranged on the rear side of the carrier and which is fastened on the carrier at least one location by way of a screw connection, as well as a reinforcement part which is involved in the screw connection, is formed as one piece from a sheet-metal part, comprises at least one rim-hole provided with an inner thread for screwing in a screw of the screw connection and with which a holding force provided by the screw may be introduced into the carrier, wherein the reinforcement part is supported on a front side of the carrier and wherein the airbag module is screwed through a hole in the carrier which is aligned with the at least one rim-hole, to the reinforcement part. By way of this, the reinforcement part which is formed in an advantageous manner from a single sheet-metal piece, fulfils several functions. One the one hand it serves for introducing a holding force provided by a screw, into the carrier on which the object to be fastened is to be attached. Moreover, with the inner thread which is provided in the at least one rim-hole, it fulfils the function of a nut, so that the screw may here be screwed directly into the reinforcement part.

A particularly advantageous design of the invention envisages a part of the reinforcement part which surrounds an opening formed by the at least one rim-hole, projecting into the hole of the carrier which is aligned with this rim-hole, and preferably protruding through this hole, thus under certain circumstances reaching at least up to the surface of the carrier which faces the airbag module. Then the mentioned part of the reinforcement part may function as a spacer and prevent a mechanical overload of the carrier due to the screw connection, by way of the airbag module at least in locations, bearing on the part of the reinforcement part which projects into the hole of the carrier, and being supported there. A preferred embodiment of the invention envisages the reinforcement part comprising at least one rim-hole provided with an inner thread, for screwing in a screw of the thread connection, wherein the sheet-metal piece, from which the reinforcement part is formed in a single-piece manner, in a vicinity of the at least one rim-hole, is bent over in a direction which is away from the rim-hole, such that at least one bent-over edge region of the sheet-metal piece at least partly encloses an opening at a side of the reinforcement part which is away from the rim-hole, said opening being formed by the rim-hole. By way of this, the reinforcement part which is still designed in a very simple manner and is formed from a single sheet-metal piece, fulfils a further advantageous function. If the sheet-metal piece in a vicinity of the at least one rim-hole in bent over in the direction away from the rim-hole in the described manner, then specifically the reinforcement part may further function as a spacer, by way of the at least one edge region of the sheet-metal piece which at least partly encloses the rim-hole, being able to be introduced into a hole in the carrier through which the screw passes and thereby being able to bridge a wall of the carrier through which this hole passes, such that a counter-bearing of the screw is held at a distance by way of the at least one edge region of the reinforcement part, which may advantageously relive the wall of the carrier. The at least one bent-over edge region then forms the part of the reinforcement part which is mentioned further above, which surrounds an opening formed by the at least one rim-hole and which projects into the hole of the carrier which is aligned with this rim-hole. Additionally, the at least one bent-over edge region of the reinforcement part, cooperating with holes in the carrier, on which the respective object is to be fastened, may serve for an advantageously simple positioning of the reinforcement part and thus of the screw connection.

In order for the at least one end region to be able to fulfil the described functions as a spacer and positioning aid, it is advantageous if it is bent by 90° or 180° out of a plane which is perpendicular to the rim-hole, in particular to the axis of the rim-hole.

A particularly simple design of the at least one edge region, which is optimised with regard to a specific application use, becomes possible if the at least one comprises a sheet-metal strip and a bent-over web which joins on the sheet-metal strip and which connects the sheet-metal strip to the remaining part of the sheet-metal piece.

Thereby, the sheet-metal strip may in particular be bent over such that it at least partly encompasses the opening formed by the respective rim-hole. The sheet-metal strip which is advantageously formed in a simple manner, then, advantageously cooperating with a further sheet-metal strip of another edge region assigned to the same rim-hole, may fulfil the function of a bushing. One preferred embodiment envisages the sheet-metal strip thereby comprising two ends which, with the web, form a T-shape. Then the two ends may be bent over such that they at least partly encompass the opening formed by the respective rim-hole, in order thus to assume the function of a bushing. Typically, in each case two of the edge regions which are formed by a sheet-metal strip and a web joining thereon, are assigned to the rim-hole or to each of the rim-holes of the reinforcement part which are designed in the described manner, wherein the webs of these two edge regions join on two opposite sides of the respective rim-hole on the remaining part of the sheet-metal piece. Thus one may succeed in the opening formed by the rim-hole being completely or almost completely encompassed by the bent-over edge regions, which is advantageous with regard to the functions to be fulfilled by the edge regions.

In an alternative embodiment, the edge region is designed in a manner such that this comprises a recess, wherein the recess for example is a semicircle or also a hole in the edge region. The recess, depending on the design, at least partly encompasses the rim-hole, and in a complete manner in the case of a hole. Thereby, typically one, preferably two end region(s) of the sheet-metal strip are bent out of a plane parallel to the recess, by 90°. The end regions thereby, at one, preferably two opposite sides of the respective rim-hole, bear on the remaining part of the sheet-metal piece. The function of the spacer is fulfilled by way of this. If only one edge region is provided, this is advantageously provided with a hole and is bent over by 180°. With the presence of two oppositely lying edge regions, each of these edge regions may have a semicircular recess which lying opposite and bent over by 180°, almost completely encompass the rim-hole. With typical embodiments of the invention, the reinforcement part is formed from a strip, wherein the at least one bent-over region may join on an edge of the strip at the height of the respective rim-hole. One may envisage the reinforcement part, in a course of the strip, then comprising at least two rim-holes which are provided with an inner thread and which are surrounded in the described manner by in each case at least one bent-over edge region. The individual reinforcement part may then serve for a screw connection to at least two fastening positions which permit a fastening which is secure also with respect to a rotation. Additionally, the reinforcement part may also comprise one or more further rim-holes with or without inner thread, which may serve for realising additional fastening points and/or a more accurate positioning of the reinforcement parts.

Additionally to the described rim-holes and the in each case at least one bent-over edge region, the reinforcement part may also have further bendings, in order to be able to follow the shape of the carrier, on which an object is to be fastened with the screw connection involving the reinforcement part.

An advantageously simple construction of an airbag arrangement results when an airbag module is fastened on the carrier of an airbag covering with the help of a reinforcement part or several reinforcement parts of the described type. Such an advantageous airbag arrangement thus comprises a carrier of an airbag covering, an airbag module which is arranged on a rear side of the carrier and which at at least one location is fastened on the carrier by way of a screw connection, as well as a reinforcement part of the previously described type, which is involved in the screw connection. Thereby, the reinforcement part is supported on a front side of the carrier, wherein the airbag module is screwed through at least one hole in the carrier, to the reinforcement part and wherein preferably the at least one edge region of the sheet-metal piece or another part of the reinforcement part which surrounds the rim-hole, projects into the at least one hole of the carrier which is aligned with the rim-hole.

The at least one edge region may advantageously be dimensioned such that is protrudes through the at least one hole of the carrier and reaches at least up to a surface of the carrier which faces the airbag module, so that the at least one edge region may fulfil the described function of a spacer for the relief of the carrier particularly well. It is particularly advantageous if the at least one bent-over edge region of the sheet-metal piece reaches exactly up to the surface of the carrier which faces the airbag module, in order one the one hand to effect a relief of the carrier from a pressure caused by the screw connection, and on the other to permit a fastening of the airbag module which has as little as possible play. In particular, a particularly stable connection results if the airbag module or a bushing which leads a screw screwed into the rim-hole and is seated in a opening in a part of the airbag, at least at locations bears on the at least one bent-over region of the reinforcement part.

In a corresponding manner, one may of course also fasten other objects on a respective carrier with the help of a reinforcement part of the described type.

Generally, such an arrangement thus comprises a carrier as well as an object which is arranged on a rear side of the carrier and which is fastened on the carrier at at least one location way of a screw connection, wherein the screw connection comprises a metallic reinforcement part which is supported on a front side of the carrier and to which the object is screwed by way of at least one hole in the carrier, wherein the reinforcement part is further formed as one piece from a sheet-metal piece and comprises at least one rim-hole provided with an inner thread, into which a screw of the screw connection is screwed, wherein the sheet-metal piece is bent over in the vicinity of the rim-hole, such that in an edge region it projects into the at least one hole of the carrier which is aligned with the rim-hole. With regard to the thus formed object, it may in particular be the case of an airbag module and with regard to the carrier it may in particular be the case of the carrier of an airbag covering.

BRIEF DESCRIPTION OF THE DRAWINGS

One embodiment example of the invention is hereinafter described by way of the FIGS. 1 to 14. There are shown in FIG. 1 a cross section through an inner trim part of a motor vehicle which, with an airbag module formed therebehind, forms an airbag arrangement of the suggested type, FIG. 2 a side view of a reinforcement part which serves as a component of a screw connection between the airbag module and the inner trim part from FIG. 1, FIG. 3 a plan view of the reinforcement part of FIG. 2, FIG. 4 a cross section through this reinforcement part at a location indicated at A-A in FIG. 3, FIG. 5 a perspective view of the reinforcement part with further components of the mentioned screw connection, FIG. 6 a similar representation of the reinforcement part in a view from a different direction, FIG. 7 a perspective view of an alternative embodiment of a reinforcement part, FIG. 8 a plan view of a reinforcement part in a further embodiment, FIG. 9 in a lateral view, a fourth embodiment example of a respective reinforcement part, FIG. 10 a plan view of the reinforcement part of FIG. 9, FIG. 11 a detail of the reinforcement part of the FIGS. 8 and 9 in an installed condition in an airbag arrangement, FIG. 12 a lateral view of a fifth embodiment example for a corresponding reinforcement part, FIG. 13 a perspective view of the reinforcement part of FIG. 12 and FIG. 14 an insulation situation of the reinforcement part of FIGS. 12 and 13 in an airbag arrangement.

DETAILED DESCRIPTION OF THE INVENTION

Figure 1:
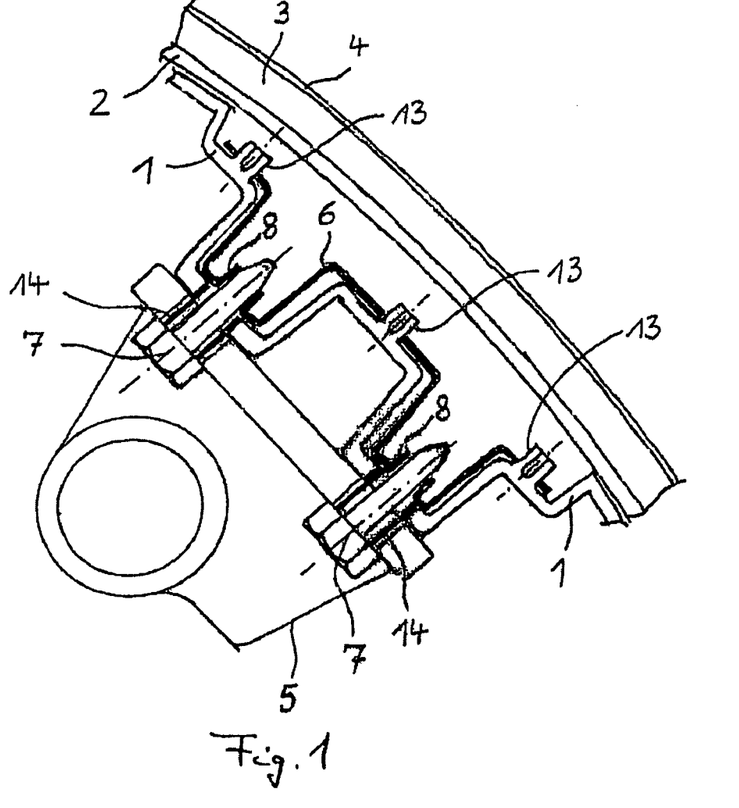
Figure 2:
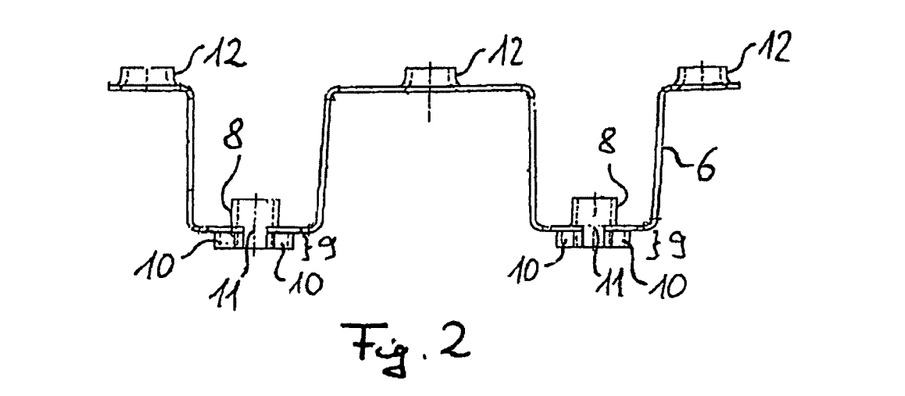

A carrier 1 of an airbag covering which at least in sections is designed in a two-dimensional manner, is to be recognised in FIG. 1. An airbag covering rests on this carrier and comprises a carrier layer 2 and a decor layer 4 which is arranged over the carrier layer 2 and is connected to this by way of a foam layer 3. The carrier 1 which is manufactured of plastic, as well as the airbag covering with the carrier layer 2, the foam layer 3 and the decor layer 4, forms an inner trim part for a motor vehicle, in the present case an instrument panel.

The airbag module 5 is screwed to each of the reinforcement parts 6 in each case through two holes in the carrier 1, for which two screws 7 which hold the airbag module 5, are screwed into each reinforcement part 6. A holding force provided by the screws 7 is thereby introduced into the carrier 1 by way of the reinforcement parts 6.

The airbag module 5 is screwed to each of the reinforcement parts 6 in each case through two holes in the carrier 1, for which two screws 7 which hold the airbag model 5, are screwed into each reinforcement part 6. A holding force provided by the screws 7 is thereby introduced into the carrier 1 by way of the reinforcement parts 6.

The reinforcement part 6 which is shown from different views in the FIGS. 2 to 6, comprise two rim-holes 8 which are in each case provided with an inner thread and into which the screws 7 are screwed with the airbag arrangement of FIG. 1. In the vicinities of the rim-holes 8 the sheet-metal piece forming the reinforcement part 6 is bent over in a direction which is away from the rim-holes 8, such that two bent-over edge regions 9 of the sheet-metal piece in each case at least partly enclose an opening which is formed by the respective rim-hole 8, at a side of the reinforcement part 6 which is away from the rim-hole 8. For this, the edge regions 9 are bent by 90° out of a plane which is perpendicular to the rim-hole 8.

Figure 3:
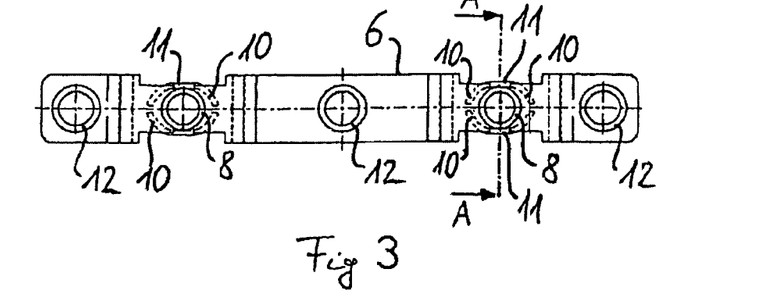
Figure 4:
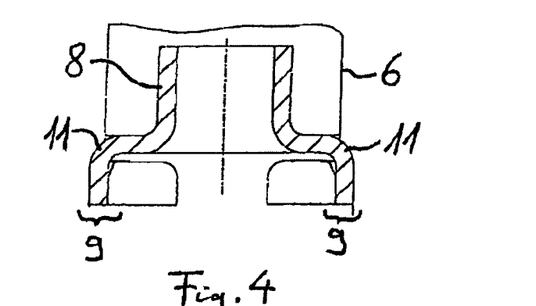
Figure 5:
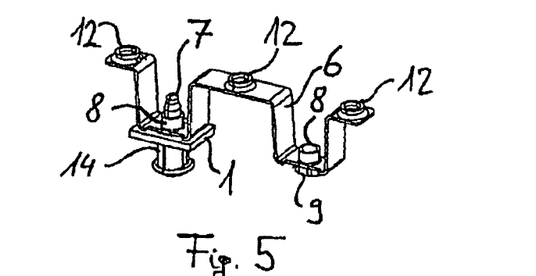
Figure 6:
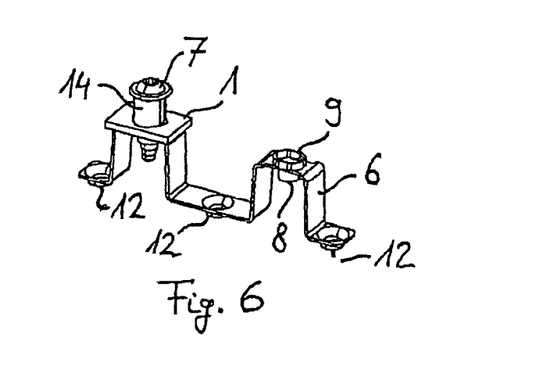

The bent-over edge regions 9 in each case encompass a sheet-metal strip with two ends 10 as well as a bent-over web 11 which joins on this sheet-metal strip and which connects the sheet-metal strip to a remaining part of the sheet-metal piece. The two ends 10 of the sheet-metal strip form a T-shape with the web 11. In FIG. 3, one may well recognise that the two ends 10 of each of these sheet-metal strips are bent over, such that they at least partly encompass the opening formed by the respective rim-hole 8. Alternatively to this, the reinforcement part may merely in each case comprise one sheet-metal strip assigned to a rim-hole, wherein the ends of the sheet-metal strip are bent up (bent over) in a manner such that the two ends contact one another or almost contact one another. An encompassing of an angular region of approx. 270° may also be realised.

The reinforcement part 6 itself is formed from a strip, which in its course is bent such that it may follow a surface course of the carrier 1. The reinforcement parts 6 in each case have a longest extension of about 12 cm. In the course of the strip, from which the reinforcement part 6 is formed, the reinforcement part 6 in the present case comprises two rim-holes 8 which in the described manner are provided with an inner thread and are surrounded by the two bent-over edge regions 9. Thereby, two of the edge regions 9 of the sheet-metal piece are assigned to each of these rim-holes 8, wherein the webs 11 of these two edge regions 9 join on two oppositely lying sides of the rim-hole 8 on the remaining part of the sheet-metal piece, thus in each case on an edge of the strip which the reinforcement part 6 forms.

Additionally, the reinforcement part 6 which is represented in the FIGS. 2 to 6, comprises three further rim-holes 12 which do not need to have an inner thread and which, with the airbag arrangement of FIG. 1, merely serve for the accurate positioning of the respective reinforcement part 6. Thereby, two of these rim-holes 12 there in each case accommodate a pin 13 integrally formed on the carrier 1.

The bent-over edge regions 9 of the reinforcement parts 6, with the airbag arrangement from FIG. 1, project into the holes in the carrier 1, which are aligned with the rim-holes 8, and specifically such that the edge regions 9 reach up to a rear-side surface of the carrier 1 which faces the airbag module 5. In order to illustrate how the airbag module 5 is fastened on the carrier 1 by way of the reinforcement parts 6, in each case a wall piece of the carrier 1 is shown in the FIGS. 5 and 6, on which wall piece the reinforcement part 6 is supported on the rear side. There, one may also recognise one of the screws 7 which are screwed into the respective rim-hole 8, as well as a bushing 14 which forms a component of the airbag module 5, through which bushing the screw 7 is led, and which bears on the edge regions 9 at least at locations. The edge regions 9 which in turn in each case bear on the inside on a wall of the respective hole in the carrier 1, thus not only serve for the positioning of the respective reinforcement part 6 on the carrier 1, but also as spacers which keep a pressure loading on the carrier 1 caused by the screw connection, to within certain limits, and permit a firm screwing of the reinforcement part 6 to the airbag module 5 without damaging the carrier 1.

Figure 7:
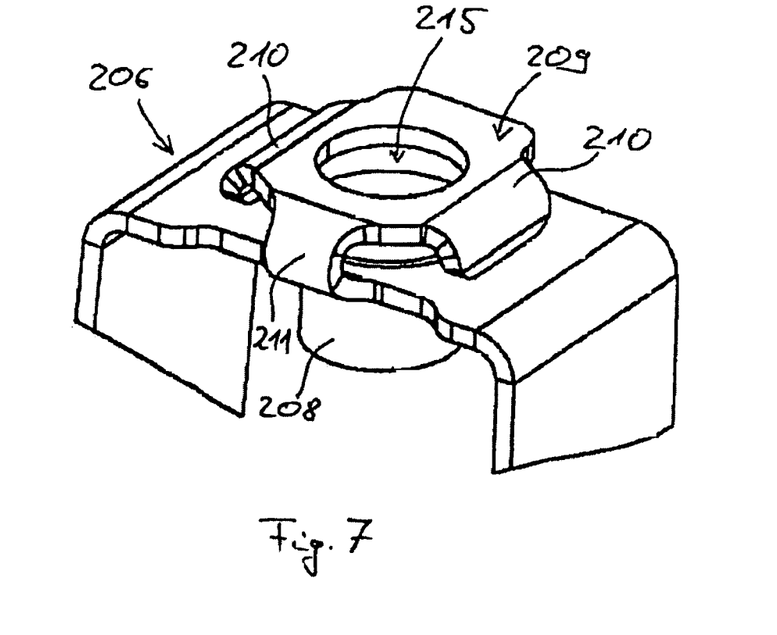

An alternative embodiment is represented in FIG. 7, wherein a part of a reinforcement part 206 is to be recognised. The shown detail of the reinforcement part 206 shows a rim-hole 208 which is directed downwards and which has an axis running from the top to the bottom. The reinforcement part 206 comprises an edge region 209, wherein the edge region 209 comprises two oppositely lying edge regions 210. The edge region 209 itself is connected via a web 211 to the reinforcement part 206. Moreover, a recess 215 is arranged in the edge region 209 and is designed as a hole and is arranged in a manner such that a screw engaging through the rim-hole 208 also reaches through the recess 215. The recess 215 thus encompasses the rim-hole 208.

The edge region 209 is bent over by 180° with respect to the part of the reinforcement part 206, on which it joints. Thereby, the end regions 210 which at two oppositely lying sides of the rim-hole 208 lie on the mentioned part of the reinforcement part 206, together with the web 211, serve as spacers, so that a distance is defined between the bent-over region 209 and the entry into the rim-hole 208. The recess 215 may be larger in comparison to the opening of the rim-hole 208 and does not need to be circular. Oval shapes which are only half closed or rectangular shapes are also possible.

As with the previously described embodiment example, the reinforcement part 206 comprises several equally designed rim-holes 208 with corresponding edge regions 209. As also with the subsequently described embodiment examples, with modifications of the airbag arrangement shown in FIG. 1, in each case it takes the place of the reinforcement part 6. Then, the edge regions 209, which here are designed differently, enter into the holes in the carrier 1 which are aligned with the rim-holes 208 and fulfil the function which was previously accomplished by the edge regions 9 with the previously described embodiment example.

Figure 8:
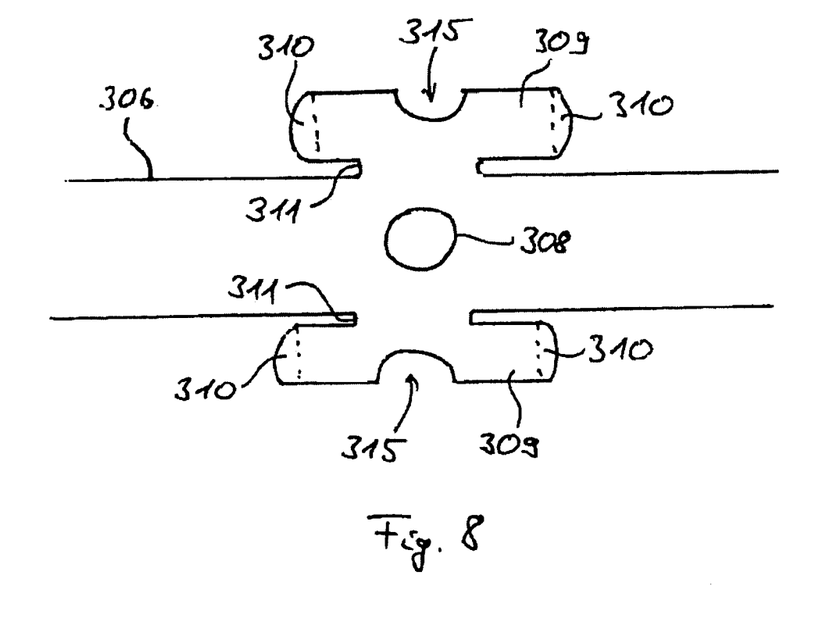

A reinforcement part 306 is represented in a further embodiment in FIG. 8 and may replace each of the reinforcement parts 6 of FIG. 1. The reinforcement part 306 comprises a rim-hole 308 and two edge regions 309 which are not yet in the bent-over condition and which both have in each case a recess 315. Moreover, in each case two end regions 310 are present, which later are bent over likewise by 90° after bending over the edge region 309 and come to lie next to the rim-hole 208 and support the edge region 309. The oppositely lying edge regions 309 thereby come to lie in relation with the rim-hole 308, such that the two recesses 315 essentially complement one another into a round recess consisting of two semicircles and enclose the rim-hole 308. Thereby, the two edge regions 309 do not however need to come into contact with one another.

The edge regions 209 from FIG. 7 as well as 309 from FIG. 8, which in each case assume the function of the edge region 9 of the first embodiment example, are bent over in each case by 180°. With the embodiment of FIG. 8, the edge regions 309 may also alternatively be bent over in each case only by 90° and subsequently be arranged as with the embodiment from the FIGS. 2 to 6.

Figure 9:
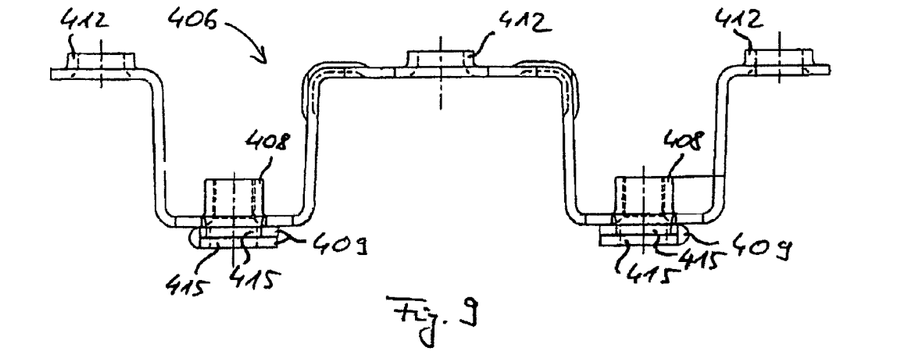
Figure 10:
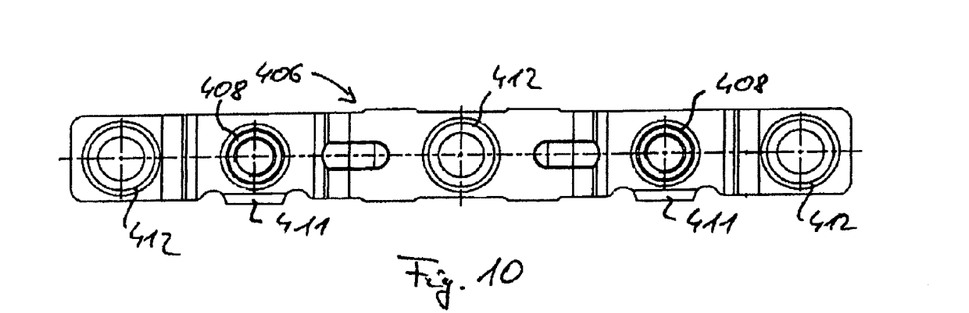
Figure 11:
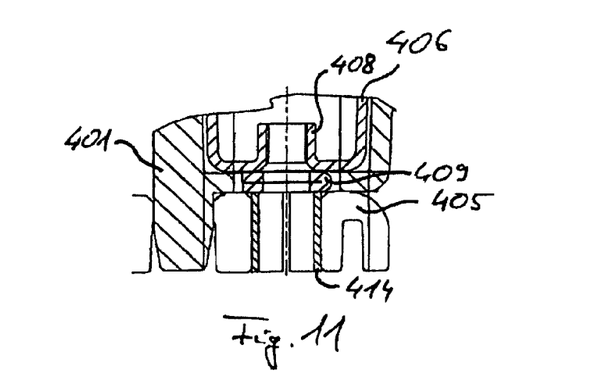

FIGS. 9 and 10 show a reinforcement part 406 which as a component of a screw connection, between an airbag module 405 and a carrier 401 in a corresponding airbag arrangement, may in each case take the place of the previously described reinforcement parts 6, 206 and 306. A typical installation situation of the reinforcement part 406 is illustrated in FIG. 11, which shows a detail of such an airbag arrangement and in which in each case also a part of the airbag arrange 405 and of the carrier 401 of an airbag covering may be recognised.

The reinforcement part 406 also comprises two rim-holes 408 provided with inner threads. In the installed condition, these rim-holes 408 are flush in each case with a hole in the carrier 401, as well as with a bushing 414 which is inserted into the airbag module 405, and accommodate a screw which has not been shown, for the connection of the airbag module 405 to the carrier 401. Three further rim-holes 412, in a manner corresponding to the rim-holes 12 of the first described embodiment, serve merely for positioning the reinforcement part 406. The reinforcement part 406 also in each case comprises a bent-over edge region 409 in the direct environment of each of the two rim-holes 408. Each of these edge regions 409 comprises a web 411 which is bent over by 180° and connects it to the remaining part of the reinforcement part 406. Moreover, two circular recesses 415 are provided in each of the two edge regions 409 and these lie over one another due to a further bend-over of the edge region 409 and are aligned with the respective rim-hole 408. The edge region 409, by way of this, is of two layers and in the installed condition, as is to be recognised in FIG. 11, lies in the hole, which is provided in the carrier 401 for receiving the screw connecting the airbag module 405 to the carrier 401. There the edge region 409 again serves as a spacer on which the bushing 414 may be supported. Even if the screw is tightened extremely firmly, the edge region 409 projecting into the hole by way of this prevents damage to the carrier manufactured of plastic.

Figure 12:
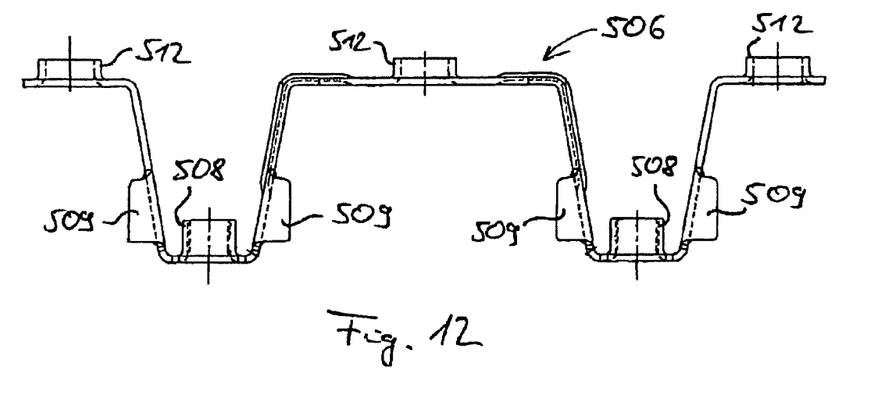
Figure 13:
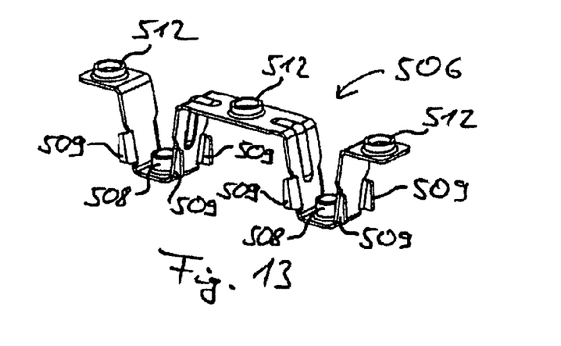
Figure 14:
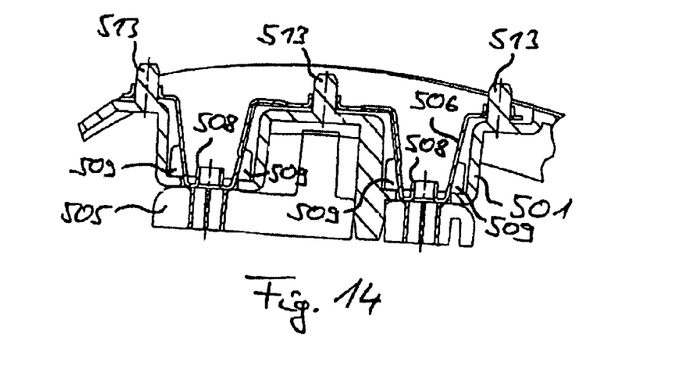

A last embodiment example is shown in the FIGS. 12 to 14, wherein FIG. 12 shows a lateral view of a reinforcement part 506, and FIG. 13 a perspective view of this reinforcement part 506. FIG. 14 shows the reinforcement part 406 which serves as a part of a screw connection for fastening an airbag module 505 shown only partly, on a carrier 501 of an airbag covering, in the installed condition.

The reinforcement part 506 comprises two rim-holes 508 which are provided with inner threads. In the installed condition, these rim-holes 508 are in each case aligned with a hole in the carrier 501, as well as with a bushing 514 inserted into the airbag module 505, and receive a screw which is also not shown here, for the connection of the airbag module 505 to the carrier 401. Three further rim-holes 512, in a manner corresponding to the rim-holes 12 and 412 of the previously described embodiment examples, serve for a positioning of the reinforcement part 406 and, for this, in each case accommodate a pin 513 of the carrier 501. As with the previously described reinforcement part 6, 206, 306 and 406, the reinforcement part 506 is also formed of a piece of sheet-metal.

The reinforcement part 506 in a vicinity of each of the two rim-holes 508 in each case comprises four bent over edge regions 509 which with this embodiment example does not come to lie in the hole in the carrier 501 as a spacer. Instead of this, the reinforcement part 506 in this case is supported with the bent-over edge regions 509 on the rear side of the carrier 1, whilst other parts of the reinforcement part 506 which directly surround the rim-holes 508, project into the holes of the carrier 501 which are aligned with the rim-holes 508, and thereby serve as spacers up to a surface of the carrier 501 which faces the airbag module 505. The airbag module 505 bears with the bushings 514 on these parts of the reinforcement part 506 projecting into the holes in the carrier 506.

The invention claimed is:

1. An airbag arrangement, comprising
a carrier of an airbag covering,
an airbag module which is arranged on a rear side of the carrier and which is fastened on the carrier at at least one location, by way of a screw connection, as well as
a single-piece reinforcement part involved in the screw connection, with at least one inner thread, for screwing in a screw of the screw connection, and with which a holding force provided by the screw may be introduced into the carrier
wherein the reinforcement part is supported on a front side of the carrier and wherein the airbag module is screwed to the reinforcement part through a hole in the carrier which is aligned with the at least one inner thread, characterized in that the reinforcement part is formed from a sheet-metal piece and comprises at least one rim-hole which is provided with the at least one inner thread, wherein the at least one rim-hole points away from the carrier,
wherein a part of the reinforcement part which surrounds an opening formed by the at least one rim-hole, projects into the hole of the carrier which is aligned with this rim-hole, and
wherein the sheet-metal piece in a vicinity of the at least one rim-hole is bent over in a direction which is away from the rim-hole such that at least one bent-over edge region of the sheet-metal piece at least partly encloses the opening formed by the rim-hole, at a side of the reinforcement part which is away from the rim-hole, wherein the at least one edge region of the sheet-metal part forms the part projecting into the at least one hole of the carrier which is aligned with the rim-hole.

2. The airbag arrangement according to claim 1, wherein the part projecting into the hole of the carrier protrudes through this hole and reaches at least up to a surface of the carrier which faces the airbag module.

3. The airbag arrangement according to claim 2, wherein the airbag module at least in places bears on the part of the reinforcement part which projects into the hole of the carrier.

4. The airbag arrangement according to claim 1, wherein the at least one edge region is bent by 90° or 180° out of a plane which is perpendicular to the rim-hole.

5. The airbag arrangement according to claim 1, wherein the at least one bent-over edge region comprises a sheet-metal strip and a bent-over web which joins on the sheet-metal strip and connects the sheet-metal strip to a connecting part of the sheet-metal piece.

6. The airbag arrangement according to claim 5, wherein the sheet-metal strip is bent over such that it at least partly encompasses the opening formed by the respective rim-hole.

7. The airbag arrangement according to claim 5, wherein the sheet-metal strip comprises two ends which form a T-shape with the web, wherein both ends are bent over such that they at least partly encompass the opening formed by the respective rim-hole.

8. The airbag arrangement according to claim 5, wherein the sheet-metal strip comprises a recess, wherein the recess encompasses the opening formed by the rim-hole at least partly.

9. The airbag arrangement according to claim 8, wherein the sheet-metal strip comprises at least one end region, wherein the at least one end region is bent by 90° out of a plane which is parallel to the recess.

10. The airbag arrangement according to claim 8, wherein the sheet-metal strip comprises two end regions, wherein the end regions are bent by 90 degrees out of a plane which is parallel to the recess.

11. The airbag arrangement according to claim 1, wherein the sheet-metal strip comprises a recess, wherein the recess completely encompasses the opening formed by the rim-hole.

12. The airbag arrangement according to claim 5, wherein two of these edge regions are assigned to the at least one rim-hole, wherein the webs of these two edge regions join on two sides, lying opposite one another, of the rim-hole, on the remaining part of the sheet-metal piece.

13. The airbag arrangement according to claim 1, wherein the reinforcement part is formed from a strip.

14. The airbag arrangement according to claim 13, wherein the reinforcement part in a course of the strip comprises at least two rim-holes which are provided with an inner thread and which are surrounded by in each case at least one bent-over edge region.

15. The airbag arrangement according to claim 1, wherein the reinforcement part comprises at least one further rim-hole with or without an inner thread.

* * * * *

UNITED STATES PATENT AND TRADEMARK OFFICE
CERTIFICATE OF CORRECTION

PATENT NO.        : 8,376,392 B2                                            Page 1 of 1
APPLICATION NO.   : 12/737726
DATED             : February 19, 2013
INVENTOR(S)       : Staebler et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 79 days.

Signed and Sealed this

First Day of September, 2015

Michelle K. Lee
*Director of the United States Patent and Trademark Office*